(12) United States Patent
Kohno et al.

(10) Patent No.: US 10,766,477 B2
(45) Date of Patent: Sep. 8, 2020

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Takashi Kohno, Tokai (JP); Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 15/952,589

(22) Filed: Apr. 13, 2018

(65) Prior Publication Data

US 2018/0297580 A1 Oct. 18, 2018

(30) Foreign Application Priority Data

Apr. 18, 2017 (JP) ................................ 2017-082408

(51) Int. Cl.
| | | |
|---|---|---|
| *B60W 20/13* | (2016.01) | |
| *B60W 20/12* | (2016.01) | |
| *B60W 10/06* | (2006.01) | |
| *B60W 10/08* | (2006.01) | |
| *B60W 30/14* | (2006.01) | |
| *B60W 30/16* | (2020.01) | |

(52) U.S. Cl.
CPC ............ *B60W 20/13* (2016.01); *B60W 10/06* (2013.01); *B60W 10/08* (2013.01); *B60W 20/12* (2016.01); *B60W 30/143* (2013.01); *B60W 30/16* (2013.01); *B60W 2510/0638* (2013.01); *B60W 2510/083* (2013.01); *B60W 2510/244* (2013.01); *B60W 2552/00* (2020.02); *B60W 2710/0644* (2013.01); *B60W 2710/083* (2013.01); *B60W 2720/106* (2013.01); *B60W 2754/30* (2020.02); *Y02T 10/52* (2013.01); *Y02T 10/6286* (2013.01); *Y10S 903/93* (2013.01)

(58) Field of Classification Search
CPC ...... B60W 20/13; B60W 20/12; B60W 10/06; B60W 10/08; B60W 30/143; B60W 30/16; B60W 2552/00; B60W 2754/30; B60W 2510/0638; B60W 2510/083; B60W 2510/244; B60W 2710/0644; B60W 2710/083; B60W 2720/106; B60W 20/11; B60W 10/26; B60W 20/40; B60W 2520/105; Y02T 10/6286; Y02T 10/52; Y10S 903/93; B60K 2006/4825; B60K 6/445

See application file for complete search history.

(56) References Cited

U.S. PATENT DOCUMENTS

2016/0152224 A1 6/2016 Tabata et al.
2016/0304086 A1* 10/2016 Mansour ................. F02D 31/00

FOREIGN PATENT DOCUMENTS

JP 2012-086771 A 5/2012
JP 2016-102441 A 6/2016

* cited by examiner

*Primary Examiner* — Angelina Shudy
*Assistant Examiner* — Chase L Cooley
(74) *Attorney, Agent, or Firm* — Oliff PLC

(57) ABSTRACT

An electronic control unit is configured to make an engine start-up threshold at a time of second operation control smaller than an engine start-up threshold at a time of first operation control. Therefore, the engine stop time at the time of the first operation control can be made long. In consequence, the vehicle efficiency can be enhanced in a vehicle in which the first operation control and the second operation control can be selectively performed.

8 Claims, 6 Drawing Sheets

VEHICLE AND CONTROL METHOD FOR VEHICLE

INCORPORATION BY REFERENCE

The disclosure of Japanese Patent Application No. 2017-082408 filed on Apr. 18, 2017 including the specification, drawings and abstract is incorporated herein by reference in its entirety.

BACKGROUND

1. Technical Field

The disclosure relates to a vehicle that includes an engine, a rotary machine, and a battery, and a control method for the vehicle.

2. Description of Related Art

A control apparatus for a vehicle that is equipped with an engine, a rotary machine that can generate a driving torque, and a battery that is charged by a motive power of the engine and that supplies an electric power to the rotary machine is well known. For instance, a vehicular running control apparatus described in Japanese Patent Application Publication No. 2012-86771 (JP 2012-86771 A) is such an example. It is disclosed in this Japanese Patent Application Publication No. 2012-86771 (JP 2012-86771 A) that the engine is prevented from being frequently started up and stopped at the time of constant-speed running control (referred to also as cruise control), by starting up the engine when a value representing a state of charge (SOC) of the battery (referred to also as a battery SOC value (%)) falls below an engine start-up threshold during motor running in cruise control, and prohibiting the engine from being stopped until the battery SOC value becomes equal to or higher than an engine stop threshold at the time of cruise control (>the engine stop threshold at the time of normal running control when cruise control is not performed) after start-up of the engine.

SUMMARY

By the way, the time in which the engine is stopped from being operated (referred to also as an engine stop time) can be lengthened as an engine start-up threshold for determining that the battery SOC value has fallen to such an extent that the engine needs to be started up to charge the battery falls. Therefore, a contribution is considered to be made to an improvement in fuel economy (referred to also as the enhancement of vehicle efficiency). On the other hand, as the engine start-up threshold falls, the likelihood of the occurrence of a shock resulting from start-up of the engine increases due to a deficiency in output electric power of the battery ascribable to a fall in the battery SOC value, or the rise in the engine rotational speed is delayed in the process of starting up the engine (i.e., the time that is needed to start up the engine lengthens), so a deterioration in drivability may be caused. Meanwhile, it is possible to conceive a vehicle in which first operation control for causing the vehicle to run based on a driver's driving operation and second operation control for causing the vehicle to run by automatically setting a target running state based on at least one of map information and road information and automatically carrying out acceleration/deceleration based on the target running state can be selectively performed. In this vehicle, at the time of the second operation control, the frequency with which a demand for sudden acceleration arises is low, and the number of scenes in which the engine is started up with large running power of the vehicle is considered to be smaller than at the time of the first operation control. Besides, at the time of the second operation control, it is also possible to assume that a deterioration in drivability is not recognized by the driver even when the driving force is reduced in starting up the engine. Therefore, it is desirable to improve fuel economy by setting the engine start-up threshold in consideration of the difference in operation control, instead of adopting an aspect in which the engine start-up threshold is uniformly set regardless of the difference in operation control.

The disclosure improves fuel economy in a vehicle in which first operation control and second operation control can be selectively performed.

A first aspect of the disclosure is a vehicle. The vehicle includes an engine, a first rotary machine that is configured to output a driving torque, a battery that is configured to be charged by a motive power of the engine and configured to supply an electric power to the first rotary machine, and an electronic control unit. The electronic control unit is configured to selectively perform first operation control and second operation control. The first operation control is control of causing the vehicle to run based on a driver's driving operation. The second operation control is control of automatically setting a target running state based on at least one of map information and road information and automatically carrying out acceleration or deceleration based on the target running state. The electronic control unit is configured to start up the engine when a value representing a state of charge of the battery falls below an engine start-up threshold while the engine is stopped from being operated. The electronic control unit is configured to make the engine start-up threshold at a time of the second operation control smaller than the engine start-up threshold at a time of the first operation control.

With the foregoing configuration, the engine start-up threshold is made smaller at the time of the second operation control when the vehicle is caused to run by automatically carrying out acceleration or deceleration based on the target running state automatically set based on at least one of the map information and the road information, than at the time of the first operation control when the vehicle is caused to run based on the driver's driving operation. Therefore, the engine stop time can be made long at the time of the second operation control when a deterioration in drivability resulting from a delay in the rise of the engine rotational speed in the process of starting up the engine is considered to be more difficult for the driver to recognize than at the time of the first operation control. In consequence, the vehicle efficiency can be enhanced (i.e., fuel economy can be improved) in the vehicle in which the first operation control and the second operation control can be selectively performed.

In the vehicle, the electronic control unit may be configured to start up the engine when the driving torque of the first rotary machine is smaller than an upper limit of the driving torque of the first rotary machine at the time of the first operation control, at the time of the second operation control.

With the foregoing configuration, at the time of the second operation control, the engine is started up when the driving torque of the first rotary machine is smaller than the upper limit of the driving torque at the time of the first operation control. Therefore, the engine can be kept from being started up with the battery overloaded at the time of the second operation control when the engine start-up threshold is made small. Thus, the battery can be restrained from deteriorating.

In the vehicle, the electronic control unit may be configured to perform the second operation control by automatically carrying out steering and the acceleration or the deceleration based on the target running state.

With the foregoing configuration, the running of the vehicle through the second operation control is realized by automatically carrying out the acceleration or the deceleration and steering based on the target running state.

In the vehicle, the electronic control unit may be configured to set the target running state by setting at least one of a target vehicle speed, a target vehicle-to-vehicle distance from a preceding vehicle, and a target spot in the map information.

With the foregoing configuration, the target running state is set by setting at least one of the target vehicle speed, the target vehicle-to-vehicle distance from the preceding vehicle, and the target spot in the map information. Therefore, the running of the vehicle through the second operation control is appropriately realized.

The vehicle may further include a second rotary machine that generates an electric power with which the battery is charged by the motive power of the engine and that rotationally drives the engine by an electric power supplied from the battery in starting up the engine. The first rotary machine may be configured to output the driving torque by the electric power supplied from the battery.

With the foregoing configuration, the vehicle includes the second rotary machine that generates the electric power with which the battery is charged by the motive power of the engine and that rotationally drives the engine by the electric power supplied from the battery in starting up the engine, and the first rotary machine that outputs the driving torque by the electric power supplied from the battery. Therefore, the engine stop time can be made longer at the time of the second operation control than at the time of the first operation control, by making the engine start-up threshold smaller at the time of the second operation control than at the time of the first operation control.

In the vehicle, the first rotary machine may have a function as a generator that generates the electric power with which the battery is charged by the motive power of the engine, a function as a starter that rotationally drives the engine by the electric power supplied from the battery in starting up the engine, and a function as an electric motor that outputs the driving torque by the electric power supplied from the battery.

With the foregoing configuration, the first rotary machine has the function as the generator that generates the electric power with which the battery is charged by the motive power of the engine, the function as the starter that rotationally drives the engine by the electric power supplied from the battery in starting up the engine, and the function as the electric motor that generates the driving torque by the electric power supplied from the battery. Therefore, the engine stop time can be made longer at the time of the second operation control than at the time of the first operation control, by making the engine start-up threshold smaller at the time of the second operation control than at the time of the first operation control.

In the vehicle, the second operation control may include unmanned operation control and manned operation control. The unmanned operation control may be operation control according to unmanned running for automatically carrying out the acceleration or the deceleration with no passenger in the vehicle. The manned operation control may be operation control according to manned running for automatically carrying out the acceleration or the deceleration with at least one passenger in the vehicle. The electronic control unit may be configured to selectively perform the unmanned operation control and the manned operation control. The electronic control unit may be configured to make the engine start-up threshold at a time of the unmanned operation control smaller than the engine start-up threshold at a time of the manned operation control.

With the foregoing configuration, the engine start-up threshold is made smaller at the time of the unmanned operation control than at the time of the manned operation control. Therefore, the engine stop time can be made longer at the time of the unmanned operation control than at the time of the manned operation control. In consequence, the vehicle efficiency can be enhanced (i.e., fuel economy can be improved) at the time of the unmanned operation control when a deterioration in drivability due to the occurrence of a shock resulting from start-up of the engine and a deterioration in drivability resulting from a delay in the rise of the engine rotational speed in the process of starting up the engine are considered not to be recognized.

A second aspect of the disclosure is a control method for a vehicle. The vehicle includes an engine, a first rotary machine that is configured to output a driving torque, a battery that is configured to be charged by a motive power of the engine and configured to supply an electric power to the first rotary machine, and an electronic control unit. The control method includes performing, by the electronic control unit, first operation control and second operation control, starting up, by the electronic control unit, the engine when a value representing a state of charge of the battery falls below an engine start-up threshold while the engine is stopped from being operated, and making, by the electronic control unit, the engine start-up threshold at a time of the second operation control smaller than the engine start-up threshold at a time of the first operation control. The first operation control is control of causing the vehicle to run based on a driver's driving operation, and the second operation control is control of automatically setting a target running state based on at least one of map information and road information and automatically carrying out acceleration/deceleration based on the target running state.

With the foregoing configuration, the engine start-up threshold is made smaller at the time of the second operation control when the vehicle is caused to run by automatically carrying out acceleration or deceleration based on the target running state automatically set based on at least one of the map information and the road information, than at the time of the first operation control when the vehicle is caused to run based on the driver's driving operation. Therefore, the engine stop time can be made long at the time of the second operation control when a deterioration in drivability resulting from a delay in the rise of the engine rotational speed in the process of starting up the engine is considered to be more difficult for the driver to recognize than at the time of the first operation control. In consequence, the vehicle efficiency can be enhanced (i.e., fuel economy can be improved) in the vehicle in which the first operation control and the second operation control can be selectively performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The embodiments of the disclosure will be described hereinafter in detail with reference to the drawings.

Figure 1:
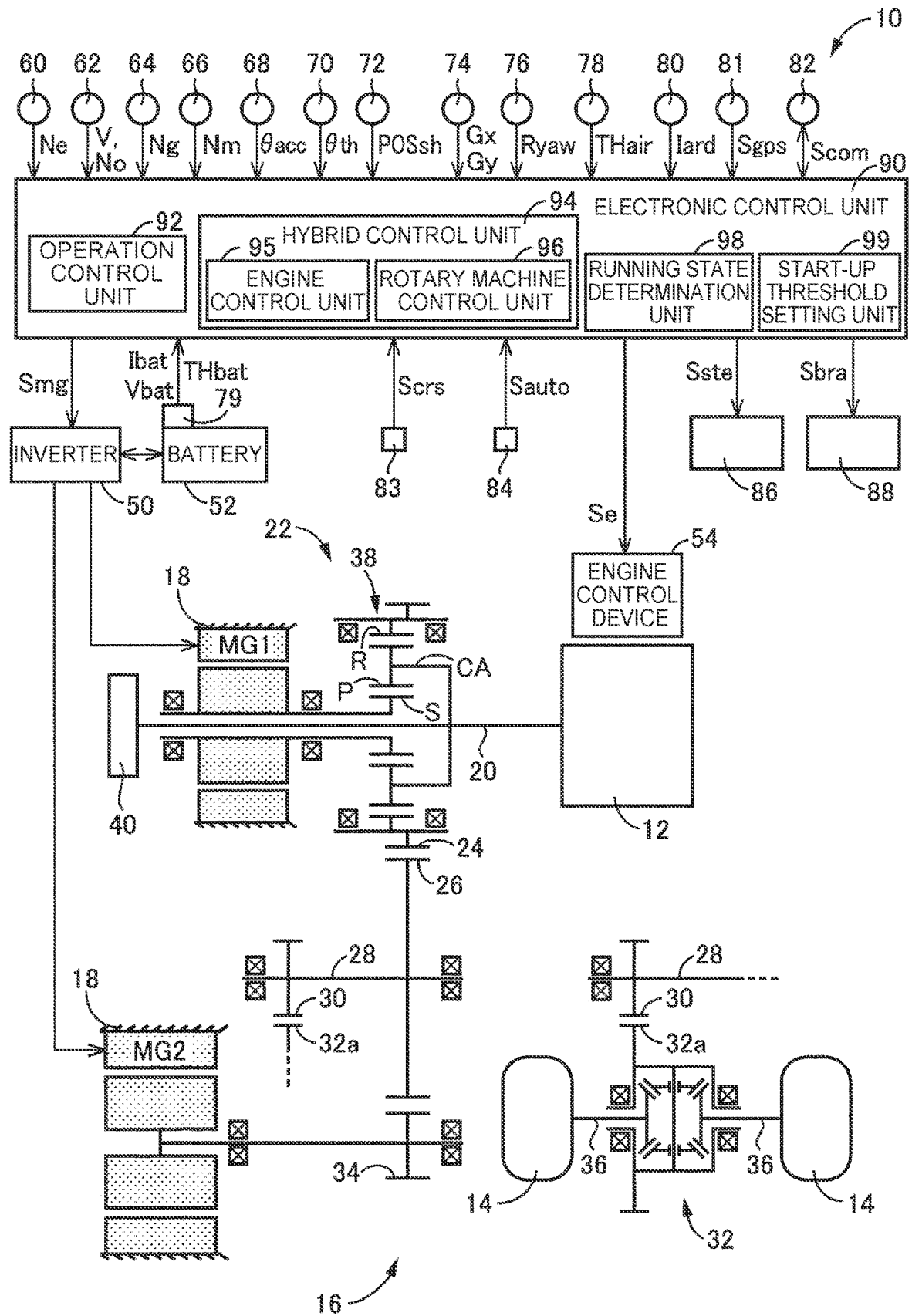
FIG. 1 is a view illustrating the general configuration of respective components regarding the running of a vehicle to which the disclosure is applied, and is a view illustrating the substantial part of a control system and control functions for controlling the respective components.

FIG. 1 is a view illustrating the general configuration of respective components regarding the running of a vehicle 10 to which the disclosure is applied, and is a view illustrating the substantial part of a control system and control functions for controlling the respective components. In FIG. 1, the vehicle 10 is a hybrid vehicle that is equipped with an engine 12 and a second rotary machine MG2 that can serve as motive power sources capable of generating driving torques. Besides, the vehicle 10 is equipped with driving wheels 14, a motive power transmission device 16 that is provided in a motive power transmission path between the engine 12 and the driving wheels 14, and a first rotary machine MG1.

The engine 12 is a known internal combustion engine such as a gasoline engine, a diesel engine or the like. The operating states of this engine 12, such as a throttle valve opening degree θth or an intake air amount, a fuel supply amount, an ignition timing and the like are controlled by an electronic control unit 90 that will be described later. Thus, an engine torque Te as an output torque of the engine 12 is controlled.

Each of the first rotary machine MG1 and the second rotary machine MG2 is a rotating electrical machine that functions as an electric motor (a motor) and that functions as a generator (a power generator), and is a so-called motor-generator. Each of the first rotary machine MG1 and the second rotary machine MG2 is connected to a battery 52 with which the vehicle 10 is equipped, via an inverter 50 with which the vehicle 10 is equipped. The inverter 50 is controlled by the electronic control unit 90 that will be described later. Thus, an MG1 torque Tg as an output torque (a power running torque or a regenerative torque) of the first rotary machine MG1 and an MG2 torque Tm (a power running torque or a regenerative torque) of the second rotary machine MG2 are controlled.

The inverter 50 controls the giving/receiving of electric power regarding the operations of the first rotary machine MG1 and the second rotary machine MG2 such that the MG1 torque Tg required of the first rotary machine MG1 and the MG2 torque Tm required of the second rotary machine MG2 are obtained. The battery 52 is an electric storage device that gives/receives electric power to/from each of the first rotary machine MG1 and the second rotary machine MG2. In concrete terms, the battery 52 is an electric storage device capable of storing the electric power generated by each of the first rotary machine MG1 and the second rotary machine MG2 and supplying the stored electric power to each of the first rotary machine MG1 and the second rotary machine MG2.

The motive power transmission device 16 is equipped with an input shaft 20 that is coupled to the engine 12 either directly or indirectly via a damper (not shown) or the like, a shift unit 22 that is coupled to the input shaft 20, a driven gear 26 that meshes with a drive gear 24 as an output rotary member of the shift unit 22, a driven shaft 28 that is fixedly provided with the driven gear 26 in a relatively unrotatable manner, a final gear 30 (the final gear 30 that is smaller in diameter than the driven gear 26) that is fixedly provided on the driven shaft 28 in a relatively unrotatable manner, a differential gear 32 that meshes with the final gear 30 via a differential ring gear 32a, a reduction gear 34 (the reduction gear 34 that is smaller in diameter than the driven gear 26) that meshes with the driven gear 26 and that is coupled to the second rotary machine MG2, and the like, in a case 18 as a non-rotary member that is attached to a vehicle body. Besides, the motive power transmission device 16 is equipped with an axle 36 and the like that are coupled to the differential gear 32. In the motive power transmission device 16 thus configured, the motive power (which is synonymous with the torque or force when no distinction is made therebetween) output from the engine 12 and the motive power output from the second rotary machine MG2 are transmitted to the driven gear 26, and are transmitted to the driving wheels 14 from the driven gear 26 sequentially via the final gear 30, the differential gear 32, the axle 36 and the like. In the motive power transmission device 16, oil that is used to lubricate and cool respective components of the motive power transmission device 16 such as a planetary gear mechanism 38, ball bearings and the like is supplied by a mechanical oil pump 40 with which the vehicle 10 is equipped and which is coupled to the input shaft 20 to be rotationally driven by the engine 12.

The shift unit 22 has the planetary gear mechanism 38 as a motive power distribution mechanism that distributes (which is synonymous to "allocates") the motive power transmitted from the engine 12 via the input shaft 20 to the first rotary machine MG1 and the drive gear 24. The planetary gear mechanism 38 is a known single pinion-type planetary gear device that is equipped with a sun gear S, a pinion gear P, a carrier CA that supports the pinion gear P such that the pinion gear P can rotate around its own axis and around the carrier CA, and a ring gear R that meshes with the sun gear S via the pinion gear P, and functions as a differential mechanism that produces a differential effect. In the planetary gear mechanism 38, the sun gear S is coupled to the first rotary machine MG1, the carrier CA is coupled to the engine 12 via the input shaft 20, and the ring gear R is formed on an inner peripheral surface of the drive gear 24. In consequence, in the vehicle 10, due to the taking of a reaction force of the engine torque Te input to the carrier CA by the first rotary machine MG1, HV running that will be described later can be realized by a directly transmitted torque (which is also referred to as an engine directly transmitted torque) mechanically transmitted to the ring gear R and the MG2 torque Tm output from the second rotary machine MG2 through the driving of the second rotary machine MG2 by an electric power generated by the first rotary machine MG1 resulting from the motive power of the engine 12 distributed to the first rotary machine MG1. Thus, the shift unit 22 functions as a known electric differential unit (an electric continuously variable transmission) whose gear ratio (speed ratio) is controlled through the control of the inverter 50 by the electronic control unit 90 that will be described later and the control of the operating state of the first rotary machine MG1. Thus, the second rotary machine MG2 is a rotary machine that can generate a driving torque.

Figure 2:
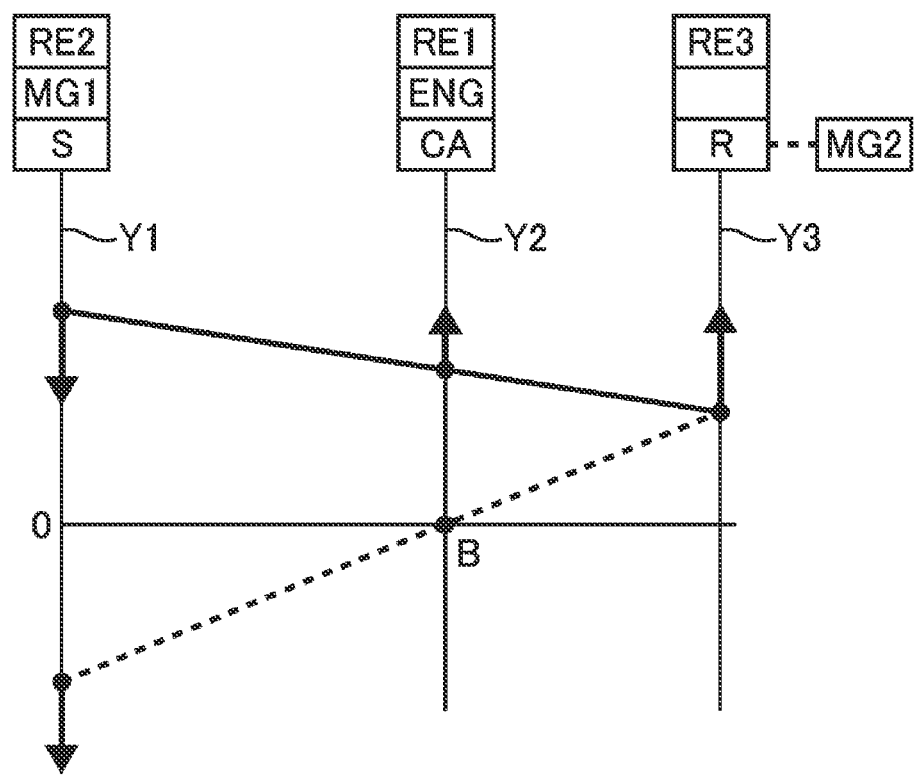
FIG. 2 is an alignment chart capable of relatively representing rotational speeds of respective rotary elements in a planetary gear mechanism, with a solid line indicating an exemplary running state at the time of an HV running mode, and with a broken line indicating an exemplary running state at the time of an EV running mode.

FIG. 2 is an alignment chart capable of relatively representing rotational speeds of three rotary elements RE1, RE2, and RE3 in the planetary gear mechanism 38. In this alignment chart, vertical lines Y1 to Y3 are sequentially shown from the left to the right on the sheet. The vertical line Y1 indicates a rotational speed of the sun gear S as the second rotary element RE2 that is coupled to the first rotary machine MG1. The vertical line Y2 indicates a rotational speed of the carrier CA as the first rotary element RE1 that is coupled to the engine (ENG) 12. The vertical line Y3 indicates a rotational speed of the ring gear R as the third rotary element RE3 that rotates integrally with the drive gear 24. The second rotary machine MG2 is coupled to this third rotary element RE3 via the driven gear 26, the reduction gear 34 and the like. A solid line in FIG. 2 indicates exemplary relative speeds of the respective rotary elements in a running state at the time of an HV running mode that will be described later. A broken line in FIG. 2 indicates exemplary relative speeds of the respective rotary elements in a running state at the time of an EV running mode that will be described later.

The operation of the vehicle 10 in the HV running mode will be described using the solid line in FIG. 2. While the engine torque Te is input to the carrier CA, the MG1 torque Tg is input to the sun gear S. In this case, the control of setting an operating point of the engine 12 that is represented by the engine rotational speed Ne and the engine torque Te as an operating point corresponding to the best fuel economy can be performed through power running control or reaction force control of the first rotary machine MG1. This hybrid type is referred to as a mechanical division type or a split type.

Besides, the operation of the vehicle 10 in the EV running mode will be described using the broken line in FIG. 2. The engine 12 is not driven (i.e., the engine 12 is stopped from being operated), the first rotary machine MG1 is unloaded (free), and the engine rotational speed Ne is equal to zero. In this case, the power running torque of the second rotary machine MG2 is transmitted to the driving wheels 14 as a driving torque in a forward traveling direction of the vehicle.

The vehicle 10 is further equipped with the electronic control unit 90 as a controller including a control apparatus for the vehicle 10 regarding the control of the engine 12, the first rotary machine MG1, the second rotary machine MG2 and the like. The electronic control unit 90 is configured to include a so-called microcomputer that is equipped with, for example, a CPU, a RAM, a ROM, an input/output interface and the like. The CPU performs various kinds of control of the vehicle 10 by carrying out a signal process in accordance with a program stored in advance in the ROM while utilizing a temporary storage function of the RAM. The electronic control unit 90 is configured, if necessary, to include a computer for controlling the engine, a computer for controlling the rotary machines, and the like.

Various signals and the like (e.g., the engine rotational speed Ne, an output rotational speed No as a rotational speed of the drive gear 24 corresponding to the vehicle speed V, an MG1 rotational speed Ng as a rotational speed of the first rotary machine MG1, an MG2 rotational speed Nm as a rotational speed of the second rotary machine MG2, an accelerator depression amount θacc as a driver's acceleration operation amount (i.e., an operation amount of an accelerator pedal) representing the magnitude of the driver's acceleration operation, a throttle valve opening degree θth as an opening degree of an electronic throttle valve, an operation position of a shift lever (a shift position) POSsh such as "P", "R", "N", "D" or the like, a longitudinal acceleration Gx of the vehicle 10, a lateral acceleration Gy of the vehicle 10, a yaw rate Ryaw as a rotational angular velocity of the vehicle 10 around a vertical axis, an outside air temperature THair around the vehicle 10, a battery temperature THbat of the battery 52, a battery charge/discharge current Ibat, a battery voltage Vbat, vehicle peripheral information Iard, a GPS signal (an orbital signal) Sgps, a communication signal Scom, a cruise control signal Scrs, an automatic operation selection signal Sauto and the like) based on detection values obtained by various sensors and the like with which the vehicle 10 is equipped (e.g., an engine rotational speed sensor 60, an output rotational speed sensor 62, an MG1 rotational speed sensor 64 such as a resolver or the like, an MG2 rotational speed sensor 66 such as a resolver or the like, an accelerator depression amount sensor 68, a throttle valve opening degree sensor 70, a shift position sensor 72, a G sensor 74, a yaw rate sensor 76, an outside air temperature sensor 78, a battery sensor 79, a traveling route recognition/obstacle detection sensor 80 such as an in-vehicle camera or the like, a GPS antenna 81, an external network communication antenna 82, a cruise control switch 83 for allowing the driver to set the running according to cruise control, an automatic operation selection switch 84 for allowing the driver to select automatic operation, and the like) are supplied to the electronic control unit 90. Besides, various command signals (e.g., an engine control command signal Se for controlling the engine 12, a rotary machine control command signal Smg for operating the inverter 50 that controls the respective rotary machines MG1 and MG2, a communication signal Scom, a steering signal Sste for operating a steering actuator 86 that controls the steering of the wheels (especially the front wheels), a braking signal Sbra for operating a brake actuator 88 that controls a foot brake, and the like) are output to respective devices with which the vehicle 10 is equipped (e.g., an engine control device 54 for a throttle actuator, a fuel injection device, an ignition device and the like, the inverter 50, the external network communication antenna 82, the steering actuator 86, the brake actuator 88, and the like) from the electronic control unit 90.

The electronic control unit 90 calculates a battery SOC value (%) as a value representing a state of charge (SOC) of the battery 52 based on, for example, the battery charge/discharge current Ibat or the like. Besides, the electronic control unit 90 calculates a chargeable electric power (an electric power that can be input) Win that prescribes the limit of the electric power input to the battery 52, and a dischargeable electric power (an electric power that can be output) Wout that prescribes the limit of the electric power output from the battery 52, based on, for example, the battery temperature THbat and the battery SOC value. For example, the chargeable electric power Win and the dischargeable electric power Wout are lowered as the battery temperature THbat falls in a low temperature region where the battery temperature THbat is lower than a normal region, and are lowered as the battery temperature THbat rises in a high temperature region where the battery temperature THbat is higher than the normal region. Besides, the chargeable electric power Win is lowered as the battery SOC value rises in, for example, a region where the battery SOC value is high. Besides, the dischargeable electric power Wout is lowered as the battery SOC value falls in, for example, a region where the battery SOC value is low.

In order to realize control functions for various kinds of control in the vehicle 10, the electronic control unit 90 is equipped with operation control means or an operation control unit 92, and hybrid control means or a hybrid control unit 94.

The operation control unit 92 can selectively perform first operation control for causing the vehicle to run based on the driver's driving operation, and second operation control for automatically setting a target running state based on at least one of map information and road information and causing the vehicle to run by automatically carrying out acceleration/deceleration based on the target running state, as operation control of the vehicle 10. The first operation control is operation control for causing the vehicle to run through manual operation according to the driver's driving operation. The manual operation is an operation method of causing the vehicle 10 to run through the driver's driving operation such as accelerator operation, brake operation, steering operation or the like. The second operation control is operation control for causing the vehicle to run through automatic operation according to automatic operation control. The automatic operation is an operation method of causing the vehicle 10 to run by automatically carrying out acceleration/deceleration, braking, steering and the like through the control performed by the electronic control unit 90 based on the signals, information and the like from the various sensors, regardless of the driver's driving operation (intention). In the present embodiment of the disclosure, the first operation control is referred to as manual operation control, and the second operation control is referred to as automatic operation control.

The operation control unit 92 performs manual operation control when automatic operation by the automatic operation selection switch 84. The operation control unit 92 performs manual operation control by controlling the engine 12 and the rotary machines MG1 and MG2 respectively based on the accelerator depression amount θacc and the like.

The operation control unit 92 performs automatic operation control when automatic operation is selected through the operation of the automatic operation selection switch 84 by the driver. The operation control unit 92 controls the engine 12 and the rotary machines MG1 and MG2 respectively based on the signals, information, and the like from the various sensors, and performs automatic operation control by operating the steering actuator 86 and the brake actuator 88. In concrete terms, the operation control unit 92 automatically sets a target running state based on at least one of map information and road information, and performs automatic operation control by automatically carrying out acceleration/deceleration, braking, and steering based on the target running state. Incidentally, this acceleration/deceleration means acceleration of the vehicle 10 and deceleration of the vehicle 10, and this deceleration may include braking. The map information is information on a position of the vehicle, a road condition such as a curve, a gradient, an altitude and the like, a target route, a legal speed, the weather and the like, based on, for example, information stored in a known navigation system and/or information acquired through communication with the outside of the vehicle. The road information is information on lanes of a track, traffic signs on the track, pedestrians on the track, and the like, acquired by, for example, the traveling route recognition/obstacle detection sensor 80 and the like. Besides, the operation control unit 92 sets the target running state by setting at least one of a target vehicle speed, a target vehicle-to-vehicle distance from a preceding vehicle, and a target spot in the map information.

The operation control unit 92 can selectively perform manual operation control according to normal running, and manual operation control according to cruise running, as manual operation control. In normal running, the vehicle runs through the performance of driving operations such as an accelerator operation, a brake operation, a steering operation and the like by the driver. In cruise running, the vehicle runs through the performance of driving operations other than the accelerator operation and the brake operation, such as the steering operation and the like, while performing control in such a manner as to maintain the target vehicle speed and/or the target vehicle-to-vehicle distance from the preceding vehicle, which have/has been set by the driver through the use of the cruise control switch 83, without recourse to the accelerator operation and brake operation performed by the driver. As described hitherto, in the present embodiment of the disclosure, cruise running is an aspect of manual operation control, and is not included in automatic operation control.

The operation control unit 92 can selectively perform automatic operation control according to unmanned running, and automatic operation control according to manned running, as automatic operation control. In unmanned running, acceleration/deceleration is automatically carried out with no passengers in the vehicle 10. In manned running, acceleration/deceleration is automatically carried out with at least one passenger in the vehicle 10.

The operation control unit 92 outputs commands for controlling the engine 12 and the rotary machines MG1 and MG2 respectively to the hybrid control unit 94. The hybrid control unit 94 has engine control means for controlling the operation of the engine 12, namely, an engine control unit 95, and rotary machine control means for controlling the operations of the first rotary machine MG1 and the second rotary machine MG2 via the inverter 50, namely, a rotary machine control unit 96. The hybrid control unit 94 performs output control of the engine 12, the first rotary machine MG1, and the second rotary machine MG2 respectively. The control performed by the hybrid control unit 94 will be concretely described hereinafter, while exemplifying a case of manual operation control according to normal running.

The hybrid control unit 94 calculates a required driving torque in the driving wheels 14 by applying the accelerator depression amount θacc and the vehicle speed V to a relationship (e.g., a driving torque map) obtained in advance through an experiment or from a designing point of view and stored (i.e., determined in advance). Incidentally, in each of manual operation control according to cruise running, automatic operation control according to unmanned running, and automatic operation control according to manned running, a required driving torque for realizing each operation control is calculated.

In consideration of the chargeable electric power Win, the dischargeable electric power Wout, and the like of the battery 52, the hybrid control unit 94 outputs command signals for controlling the engine 12, the first rotary machine MG1, and the second rotary machine MG2 (the engine control command signal Se and the rotary machine control command signal Smg) in such a manner as to realize the required driving torque. The engine control command signal Se is, for example, a command value for an engine power Pe as a power of the engine 12 that outputs the engine torque Te at the engine rotational speed Ne at that time. The rotary machine control command signal Smg is, for example, a command value for the electric power generated by the first rotary machine MG1 that outputs a reaction torque of the engine torque Te (the MG1 torque Tg at the MG1 rotational speed Ng at that time), and is a command value for the electric power consumed by the second rotary machine MG2 that outputs the MG2 torque Tm at the MG2 rotational speed Nm at that time.

Figure 3:
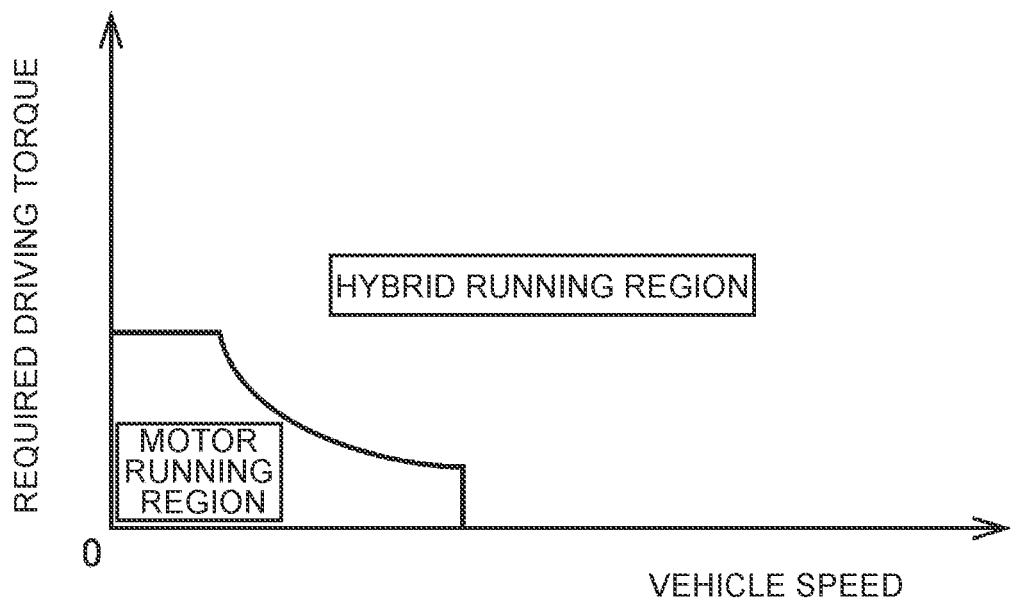
FIG. 3 is a view showing an exemplary EV/HV region map that is used to make a changeover between EV running and HV running.

The hybrid control unit 94 selectively establishes a motor running (referred to also as EV running) mode and a hybrid running (referred to also as HV running) mode, as a running mode, in accordance with a running state. The hybrid control unit 94 establishes the EV running mode when it is determined that the state of the vehicle is in an EV running region, and establishes the HV running mode when it is determined that the state of the vehicle is in an HV running region, by applying the vehicle speed V and the required driving torque to a relationship (an EV/HV region map) determined in advance and having a changeover line (a solid line) that separates the EV running region and the HV running region from each other in, for example, a two-dimensional coordinate system as shown in FIG. 3 in which the vehicle speed V and the required driving torque are used as variables. In FIG. 3, the EV running region is set as a low vehicle speed region where the vehicle speed V is relatively low, and as a low driving torque region where the required driving torque is relatively low to the extent of being secured only by the MG2 torque Tm. Besides, the hybrid control unit 94 establishes the HV running mode if the battery SOC value is lower than an engine start-up threshold Sengst even when the state of the vehicle is in the EV running region. Incidentally, in each of manual operation control according to cruise running, automatic operation control according to unmanned running, and automatic operation control according to manned running as well as manual operation control according to normal running, the EV running mode and the HV running mode are selectively established.

When the EV running mode is established, the hybrid control unit 94 enables EV running in which the engine 12 is stopped from being operated and only the second rotary machine MG2 is adopted as a motive power source for running through the use of the electric power from the battery 52.

When the HV running mode is established, the hybrid control unit 94 transmits an engine directly-transmitted torque to the drive gear 24 by taking charge of a reaction force for the motive power of the engine 12 through the generation of electric power by the first rotary machine MG1, and enables HV running in which a torque is transmitted to the driving wheels 14 to cause the vehicle to run by driving the second rotary machine MG2 through the electric power generated by the first rotary machine MG1. In this HV running mode, the vehicle can also run through the use of the electric power from the battery 52 to which the driving torque generated by the second rotary machine MG2 is further added. As described hitherto, the second rotary machine MG2 is a rotary machine that generates a driving torque by the electric power supplied from the battery 52, as is also indicated by the aspect at the time of the above-mentioned EV running mode.

In the case where the state of the vehicle shifts from the EV running region to the HV running region or the battery SOC value falls below the engine start-up threshold Sengst when the engine 12 is stopped from being operated, the hybrid control unit 94 (especially the engine control unit 95) establishes the HV running mode and starts up the engine 12. The engine control unit 95 starts up the engine 12 by raising the engine rotational speed Ne by the first rotary machine MG1 and igniting the engine. That is, the engine control unit 95 starts up the engine 12 by cranking the engine 12 through power running of the first rotary machine MG1. When the engine 12 is started up on the ground that the battery SOC value has fallen below the engine start-up threshold Sengst, the hybrid control unit 94 causes the first rotary machine MG1 to generate an electric power by the motive power of the engine 12, and stores the electric power generated by the first rotary machine MG1 into the battery 52, after the completion of the start-up of the engine. As described hitherto, the battery 52 is charged by the motive power of the engine 12. The first rotary machine MG1 is a rotary machine that generates an electric power with which the battery 52 is charged by the motive power of the engine 12, and that rotationally drives the engine 12 by the electric power supplied from the battery 52 in starting up the engine 12.

In starting up the engine by the first rotary machine MG1, the hybrid control unit 94 causes the second rotary machine MG2 to output a reaction force cancelling torque to restrain the driving torque from falling due to the reaction torque for a cranking torque of the first rotary machine MG1. Therefore, at the time of the EV running mode, it is necessary to secure an output electric power of the battery 52 for generating the cranking torque of the first rotary machine MG1 and the reaction force cancelling torque of the second rotary machine MG2, in preparation for start-up of the engine. If the output electric power of the battery 52 that is needed to start up the engine is not secured when the engine is started up, part of the output electric power of the battery 52 for generating the driving torque is used to start up the engine. Thus, a shock occurs as a result of start-up of the engine, so a deterioration in drivability may be caused. Alternatively, if the output electric power of the battery 52 that is needed to start up the engine is not secured when the engine is started up, the rise in the engine rotational speed Ne in the process of starting up the engine is delayed (i.e., it takes a long time to start up the engine), so a deterioration in drivability may be caused. For this reason, an upper-limit driving torque in the EV running region (in other words, an upper limit of the MG2 torque Tm that is allowed to be generated as a driving torque at the time of the EV running mode) is determined in advance in consideration of the output electric power of the battery 52 that is needed to start up the engine (i.e., in such a manner as to prevent a deterioration in drivability when the engine is started up). On the other hand, as described previously, the dischargeable electric power Wout is lowered as the battery SOC value falls in, for example, the region where the battery SOC value is low. When the dischargeable electric power Wout is lowered, it becomes difficult to secure the output electric power of the battery 52 that is needed to start up the engine. Therefore, the battery SOC value needs to be made high by charging the battery 52. For this reason, the engine start-up threshold Sengst is determined in advance as a lower limit of the battery SOC value for securing the output electric power of the battery 52 that is needed to start up the engine, in such a manner as to prevent a deterioration in drivability when the engine is started up. In other words, the engine start-up threshold Sengst is a threshold determined in advance to determine that the battery SOC value makes it necessary to charge the battery 52 by forcibly starting up the engine 12.

Figure 4:
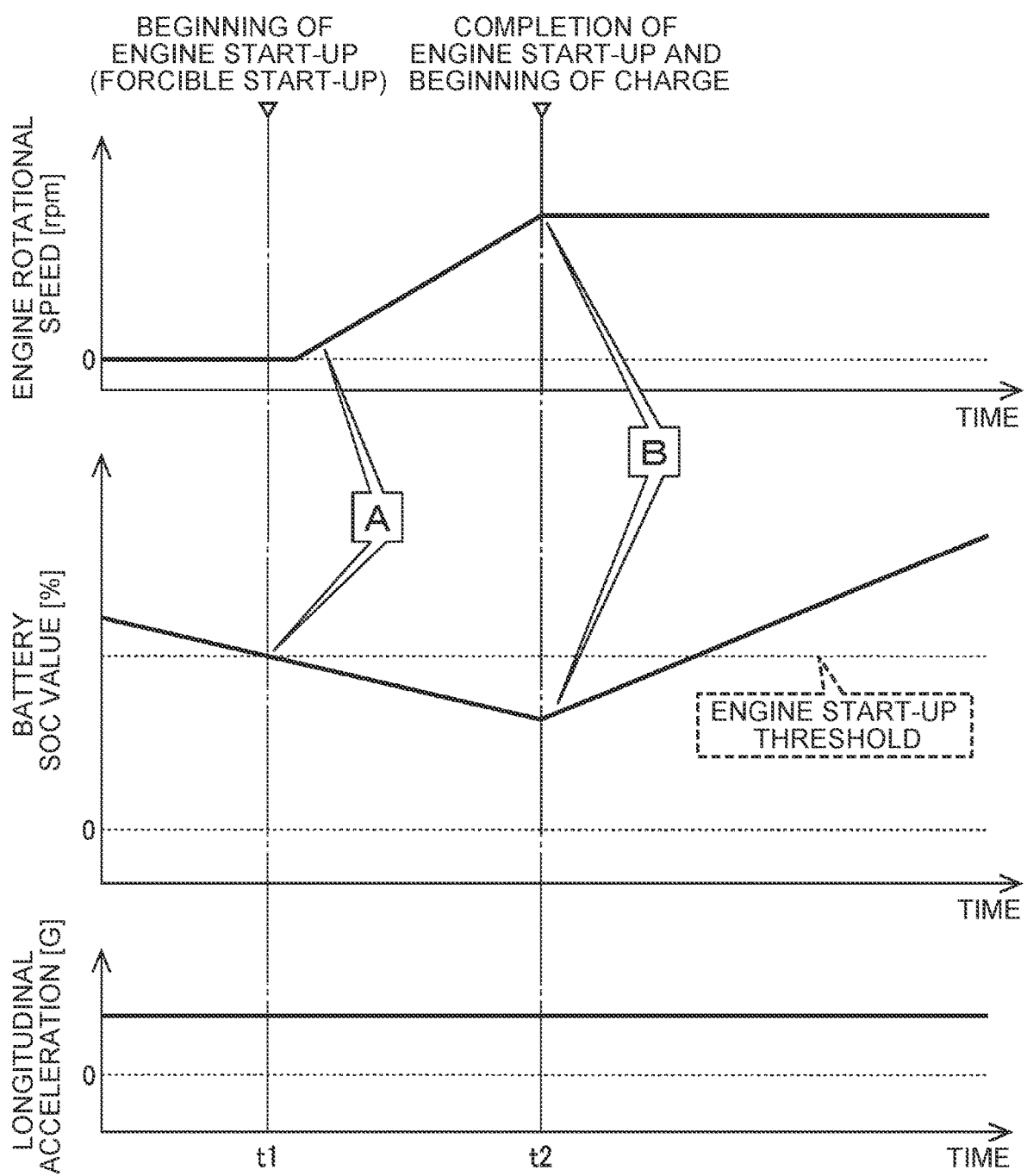
FIG. 4 is a view showing an exemplary time chart for illustrating a mode of engine start-up that is carried out as the SOC value of a battery falls at the time of manual operation control according to normal running.

FIG. 4 is a view showing an exemplary time chart for illustrating the mode of start-up of the engine that is carried out as the SOC value of the battery falls at the time of manual operation control according to normal running. In FIG. 4, a time point t1 indicates a time point when start-up of the engine 12 is begun on the ground that the battery SOC value has fallen below the engine start-up threshold Sengst when the engine 12 is stopped from being operated (see A portions). The engine rotational speed Ne is raised through the cranking by the first rotary machine MG1, and the engine 12 is ignited (see the section from the time point t1 to a time point t2). In this process of starting up the engine, the output electric power of the battery 52 that is needed to start up the engine is secured. Therefore, the engine rotational speed Ne has been swiftly raised, the longitudinal acceleration Gx does not fluctuate, and no shock occurs as a result of start-up of the engine. The time point t2 indicates a time point when autonomous operation of the engine 12 is made possible after ignition thereof, forcible start-up of the engine 12 is completed, and the generation of electric power by the first rotary machine MG1 is started by the motive power of the engine 12 to start charging the battery 52 (see B portions). After the charge of the battery 52 is started, the battery SOC value is raised (see the section from the time point t2).

By the way, if the engine start-up threshold Sengst is set low, the engine stop time can be lengthened by lengthening the period of the EV running mode, so fuel economy (the vehicle efficiency) can be improved. However, if the engine start-up threshold Sengst is set low, a deterioration in drivability may be caused due to the deficiency in the output electric power of the battery resulting from a fall in the battery SOC value. On the other hand, the degree of recognition of a deterioration in drivability by the driver is considered to differ depending on whether manual operation control or automatic operation control is performed. Thus, in the present embodiment of the disclosure, fuel economy is improved by setting the engine start-up threshold Sengst in consideration of the difference in operation control of the vehicle 10, instead of adopting the aspect in which the engine start-up threshold Sengst is uniformly set regardless of the difference in operation control of the vehicle 10.

In order to realize the setting of the engine start-up threshold Sengst in consideration of the above-mentioned difference in operation control of the vehicle 10, the electronic control unit 90 is further equipped with running state determination means or a running state determination unit 98, and start-up threshold setting means or a start-up threshold setting unit 99.

The running state determination unit 98 determines whether or not automatic operation control is being performed. If it is determined that automatic operation control is being performed, the running state determination unit 98 determines whether or not the vehicle is running in an unmanned mode. If it is determined that automatic operation control is not being performed (i.e., if it is determined that manual operation control is being performed), the running state determination unit 98 determines whether or not the vehicle is running in a cruising mode.

If the running state determination unit 98 determines that automatic operation control is being performed and that the vehicle is running in the unmanned mode (i.e., at the time of automatic operation control according to unmanned running), the start-up threshold setting unit 99 sets an engine start-up threshold Sengst1 (at the time of unmanned running) as the engine start-up threshold Sengst. If the running state determination unit 98 determines that automatic operation control is being performed and that the vehicle is not running in the unmanned mode (i.e., at the time of automatic operation control according to manned running), the start-up threshold setting unit 99 sets an engine start-up threshold Sengst2 (at the time of automatic manned running) as the engine start-up threshold Sengst. If the running state determination unit 98 determines that automatic operation control is not being performed and that the vehicle is running in the cruising mode (i.e., at the time of manual operation control according to cruising running), the start-up threshold setting unit 99 sets an engine start-up threshold Sengst3 (at the time of cruising) as the engine start-up threshold Sengst. If the running state determination unit 98 determines that automatic operation control is not being performed and that the vehicle is not running in the cruising mode (i.e., at the time of manual operation control according to normal running), the start-up threshold setting unit 99 sets an engine start-up threshold Sengst4 (at the time of normal running) as the engine start-up threshold Sengst.

In automatic operation control, especially at the time of unmanned running, a deterioration in drivability due to the occurrence of a shock resulting from start-up of the engine, and a deterioration in drivability due to a delay in the rise of the engine rotational speed Ne in the process of starting up the engine are considered not to be recognized. Therefore, this unmanned running gives priority to an improvement in fuel economy. The start-up threshold setting unit 99 sets the engine start-up threshold Sengst1 (at the time of unmanned running) smaller than the engine start-up threshold Sengst2 (at the time of automatic manned running), the engine start-up threshold Sengst3 (at the time of cruising), and the engine start-up threshold Sengst4 (at the time of normal running). As described hitherto, the start-up threshold setting unit 99 makes the engine start-up threshold Sengst smaller at the time of automatic operation control (especially at the time of unmanned running) than at the time of manual operation control. Besides, the start-up threshold setting unit 99 makes the engine start-up threshold Sengst smaller at the time of automatic operation control according to unmanned running than at the time of automatic operation control according to manned running.

In automatic operation control according to manned running, the driver's sensitivity to a shock can also be considered to be higher, and a deterioration in drivability due to the occurrence of the shock resulting from start-up of the engine can also be considered to be easier to recognize than in manual operation control according to the same manned running. Therefore, this automatic operation control according to manned running gives priority to the damping of the shock resulting from start-up of the engine. The start-up threshold setting unit 99 sets the engine start-up threshold Sengst2 (at the time of automatic manned running) larger than both the engine start-up threshold Sengst3 (at the time of cruising) and the engine start-up threshold Sengst4 (at the time of normal running).

At the time of cruise running during manual operation control, the driver's sensitivity to a shock can also be considered to be higher, and a deterioration in drivability due to the occurrence of the shock resulting from start-up of the engine can also be considered to be easier to recognize than at the time of normal running during the same manual operation control. Therefore, this manual operation control according to cruise running gives priority to the damping of the shock resulting from start-up of the engine. The start-up threshold setting unit 99 sets the engine start-up threshold Sengst3 (at the time of cruising) larger than the engine start-up threshold Sengst4 (at the time of normal running).

The relationship in the magnitude of the engine start-up threshold Sengst among the respective types of operation control of the vehicle 10 is determined such that the engine start-up threshold Sengst1 (at the time of unmanned running)<the engine start-up threshold Sengst4 (at the time of normal running)<the engine start-up threshold Sengst3 (at the time of cruising)<the engine start-up threshold Sengst2 (at the time of automatic manned running). The priority of fuel economy rises as the engine start-up threshold Sengst decreases. The priority of drivability (especially the damping of a shock) rises as the engine start-up threshold Sengst increases. Besides, the engine start-up threshold Sengst4 (at the time of normal running) may be made equal to the engine start-up threshold Sengst determined in advance so as to prevent a deterioration in drivability in starting up the engine, but the disclosure is not limited to this aspect thereof. The engine start-up threshold Sengst for each type of operation control may be appropriately determined depending on whether importance is attached to fuel economy or drivability.

It should be noted herein that when the engine start-up threshold Sengst is made small to lower the dischargeable electric power Wout of the battery 52, the remaining electric power that can be output from the battery 52 during EV running may become small, and the load of the battery 52 may become large in starting up the engine. On the other hand, when the driving torque generated by the second rotary machine MG2 is small in the process of starting up the engine 12, the remaining electric power that can be output from the battery 52 becomes large. Thus, in starting up the engine 12 on the ground that the battery SOC value has fallen below the engine start-up threshold Sengst at the time of automatic operation control (especially at the time of unmanned running) when the engine start-up threshold Sengst is made small, the engine control unit 95 begins to start up the engine 12 when the driving torque generated by the second rotary machine MG2 is small or when the driving torque generated by the second rotary machine MG2 becomes small. In concrete terms, the engine control unit 95 starts up the engine 12 when the MG2 torque Tm generated as the driving torque by the second rotary machine MG2 is smaller than the upper limit of the MG2 torque Tm that is allowed to be generated as the driving torque at the time of manual operation control, at the time of automatic operation control (especially unmanned running).

Figure 5:
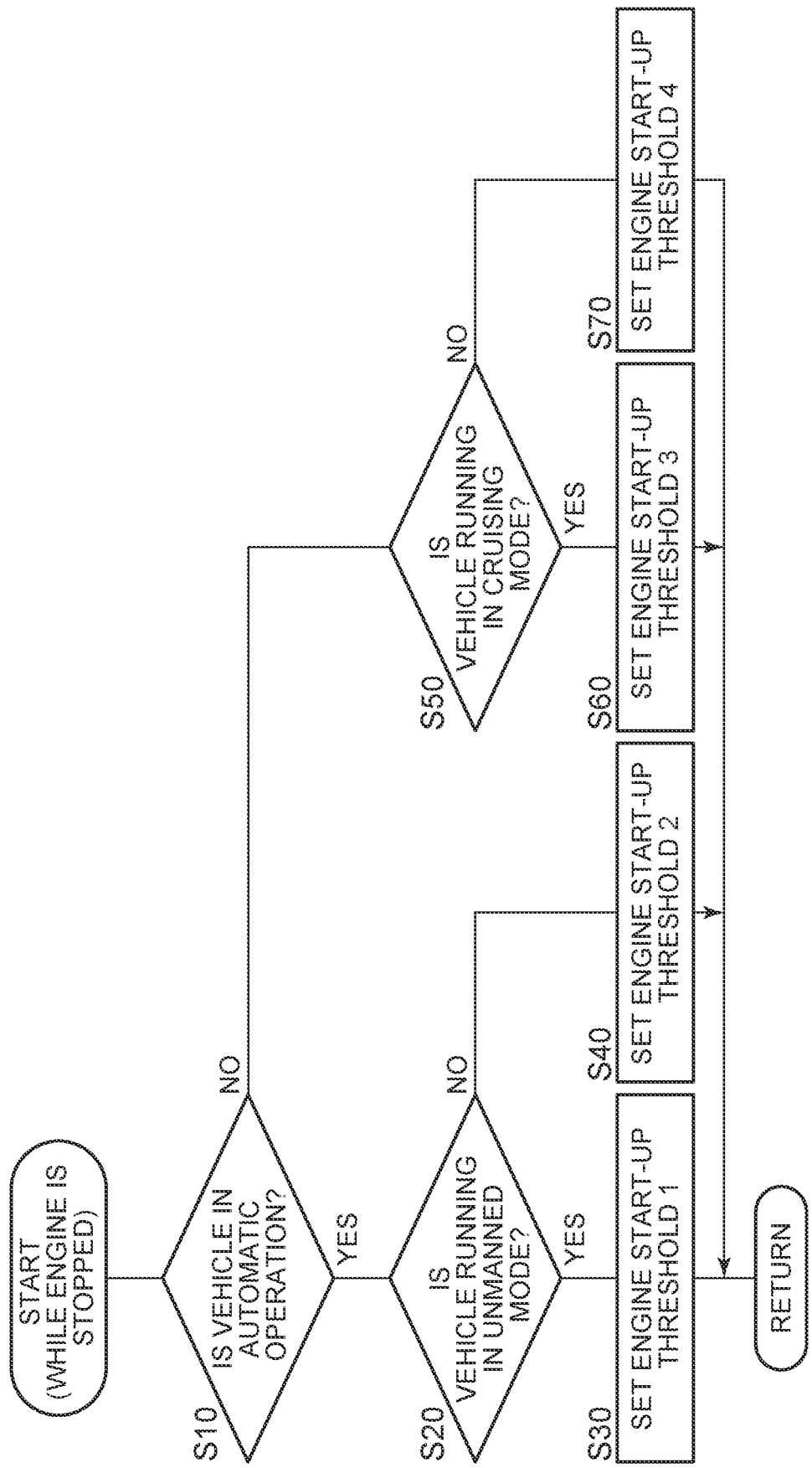
FIG. 5 is a flowchart illustrating the substantial part of control operation of an electronic control unit, namely, control operation for improving fuel economy in a vehicle in which manual operation control and automatic operation control can be selectively performed.
Figure 6:
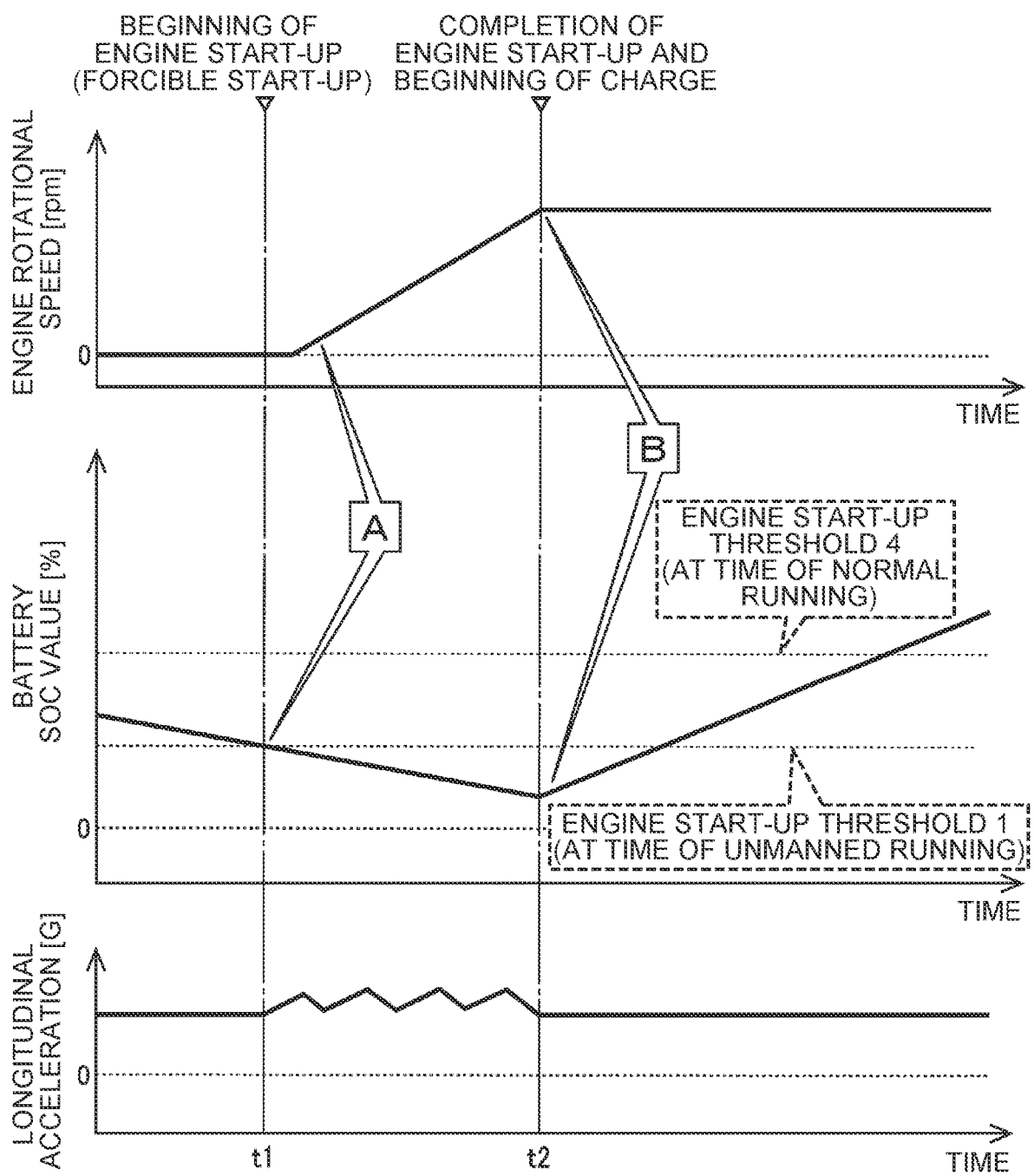
FIG. 6 is an exemplary time chart in the case where the control operation shown in the flowchart of FIG. 5 is performed, and is a view showing a mode of engine start-up that is carried out as the SOC value of the battery falls at the time of automatic operation control according to unmanned running.

FIG. 5 is a flowchart illustrating the substantial part of the control operation of the electronic control unit 90, namely, the control operation for improving fuel economy in the vehicle 10 in which manual operation control and automatic operation control are selectively performed. This flowchart is repeatedly executed, for example, while the engine 12 is stopped from being operated. FIG. 6 is an exemplary time chart in the case where the control operation shown in the flowchart of FIG. 5 is performed, and is a view showing a mode of engine start-up that is carried out as the battery SOC value falls at the time of automatic operation control according to unmanned running.

In FIG. 5, first of all, in step (the word "step" will be omitted hereinafter) S10 corresponding to the function of the running state determination unit 98, it is determined whether or not automatic operation control is being performed. If the result of the determination in this step S10 is positive, it is determined in S20 corresponding to the function of the running state determination unit 98 whether or not the vehicle is running in the unmanned mode. If the result of the determination in this S20 is positive, the engine start-up threshold Sengst1 (at the time of unmanned running) is set as the engine start-up threshold Sengst in S30 corresponding to the function of the start-up threshold setting unit 99. At the time of automatic operation control according to unmanned running, a deterioration in drivability due to the occurrence of a shock resulting from start-up of the engine and a deterioration in drivability resulting from a delay in the rise of the engine rotational speed Ne in the process of starting up the engine are less recognized than at the time of manual operation control according to normal running. Therefore, the engine start-up threshold Sengst1 (at the time of unmanned running) is set to a small value to improve fuel economy. If the result of the determination in the aforementioned S20 is negative, the engine start-up threshold Sengst2 (at the time of automatic manned running) is set as the engine start-up threshold Sengst in S40 corresponding to the function of the start-up threshold setting unit 99. At the time of automatic operation control according to manned running, a deterioration in drivability due to the occurrence of a shock resulting from start-up of the engine and a deterioration in drivability resulting from a delay in the rise of the engine rotational speed Ne in the process of starting up the engine tend to be more conspicuous than at the time of automatic operation control according to unmanned running. Therefore, the engine start-up threshold Sengst2 (at the time of automatic manned running) is set to a large value to improve drivability. On the other hand, if the result of the determination in the aforementioned S10 is negative, it is determined whether or not the vehicle is running in the cruising mode, in S50 corresponding to the function of the running state determination unit 98. If the result of the determination in this S50 is positive, the engine start-up threshold Sengst3 (at the time of cruising) is set as the engine start-up threshold Sengst, in S60 corresponding to the function of the start-up threshold setting unit 99. At the time of manual operation control according to cruise running, a deterioration in drivability due to the occurrence of a shock resulting from start-up of the engine tends to be more conspicuous than at the time of manual operation control according to normal running. Therefore, the engine start-up threshold Sengst3 (at the time of cruising) is set to a large value to improve drivability. If the result of the determination in the aforementioned S50 is negative, the engine start-up threshold Sengst4 (at the time of normal running) is set as the engine start-up threshold Sengst, in S70 corresponding to the function of the start-up threshold setting unit 99. At the time of manual operation control according to normal running, the engine start-up threshold Sengst determined in advance so as to prevent a deterioration in drivability in starting up the engine is set as the engine start-up threshold Sengst4 (at the time of normal running).

In FIG. 6, at the time of automatic operation control according to unmanned running, the engine start-up threshold Sengst1 (at the time of unmanned running) is set smaller than the engine start-up threshold Sengst4 (at the time of normal running) such that the engine 12 is kept to the utmost from being started up when the battery SOC value falls and that fuel economy is improved. When the engine 12 is stopped from being operated, start-up of the engine 12 is begun on the ground that the battery SOC value has fallen below the engine start-up threshold Sengst1 (at the time of unmanned running) (see the time point t1), and the engine 12 is ignited after raising the engine rotational speed Ne through cranking by the first rotary machine MG1 (see the section from the time point t1 to the time point t2) (see the A portions). Because the engine start-up threshold Sengst1 (at the time of unmanned running) is a small value, the output electric power of the battery 52 that is needed to start up the engine is difficult to secure. Therefore, in this process of starting up the engine, when an attempt is made to swiftly raise the engine rotational speed Ne, the longitudinal acceleration Gx fluctuates, so a shock occurs as a result of start-up of the engine. Due to unmanned running, a deterioration in drivability due to the occurrence of the shock resulting from start-up of the engine is not recognized. The effect of improving fuel economy is obtained by making the engine start-up threshold Sengst1 (at the time of unmanned running) small. After the engine is ignited, autonomous operation of the engine 12 is made possible, and forcible start-up of the engine 12 is completed. Also, the charge of the battery 52 is started after the start of generation of electric power by the first rotary machine MG1 by the motive power of the engine 12 (see the time point t2), and the battery SOC value is raised (see the section from the time point t2) (see the B portions).

As described above, according to the present embodiment of the disclosure, at the time of automatic operation control when the vehicle is caused to run by automatically carrying out acceleration/deceleration based on the target running state automatically set based on at least one of the map information and the road information, the engine start-up threshold Sengst is made smaller than at the time of manual operation control when the vehicle is caused to run based on the driver's driving operation. Therefore, the engine stop time can be made long at the time of automatic operation control when a deterioration in drivability resulting from a delay in the rise of the engine rotational speed Ne in the process of starting up the engine is considered to be more difficult for the driver to recognize than at the time of manual operation control. In consequence, the vehicle efficiency can be enhanced (i.e., fuel economy can be improved) in the vehicle 10 in which the first operation control and the second operation control can be selectively performed.

Besides, according to the present embodiment of the disclosure, at the time of automatic operation control, the engine 12 is started up when the MG2 torque Tm generated as the driving torque by the second rotary machine MG2 is smaller than the upper limit of the MG2 torque Tm that is allowed to be generated as the driving torque at the time of manual operation control. Therefore, at the time of automatic operation control when the engine start-up threshold Sengst is made small, the engine can be kept from being started up with the battery 52 overloaded. Thus, the battery 52 can be restrained from deteriorating.

Besides, according to the present embodiment of the disclosure, the running of the vehicle through automatic operation control is realized by automatically carrying out acceleration/deceleration and steering based on the target running state.

Besides, according to the present embodiment of the disclosure, the target running state is set by setting at least one of the target vehicle speed, the target vehicle-to-vehicle distance from the preceding vehicle, and the target spot in map information. Therefore, the running of the vehicle through automatic operation control is appropriately realized.

Besides, according to the present embodiment of the disclosure, at the time of automatic operation control according to unmanned running, the engine start-up threshold Sengst is made smaller than at the time of automatic operation control according to manned running. Therefore, the engine stop time can be made longer at the time of automatic operation control according to unmanned running than at the time of automatic operation control according to manned running. In consequence, fuel economy can be improved at the time of automatic operation control according to unmanned running when a deterioration in drivability due to the occurrence of a shock resulting from start-up of the engine and a deterioration in drivability resulting from a delay in the rise of the engine rotational speed Ne in the process of starting up the engine are considered not to be recognized.

Next, another one of the embodiments of the disclosure will be described. Incidentally, the components common to the embodiments of the disclosure in the following description will be denoted by the same reference symbols respectively, and the description thereof will be omitted.

In the present embodiment of the disclosure, a relationship in magnitude of the engine start-up threshold Sengst among the respective types of operation control of the vehicle 10, which is different from that of the foregoing first embodiment of the disclosure, is exemplified.

In automatic operation control, a deterioration in drivability resulting from a delay in the rise of the engine rotational speed Ne in the process of starting up the engine is considered to be more difficult to recognize than in manual operation control. Therefore, this automatic operation control gives priority to an improvement in fuel economy. The start-up threshold setting unit 99 sets each of the engine start-up threshold Sengst1 (at the time of unmanned running) and the engine start-up threshold Sengst2 (at the time of automatic manned running) smaller than both the engine start-up threshold Sengst3 (at the time of cruising) and the engine start-up threshold Sengst4 (at the time of normal running). As described hitherto, the start-up threshold setting unit 99 makes the engine start-up threshold Sengst smaller at the time of automatic operation control than at the time of manual operation control.

In unmanned running through automatic operation control, a deterioration in drivability due to the occurrence of a shock resulting from start-up of the engine and a deterioration in drivability resulting from a delay in the rise of the engine rotational speed Ne in the process of starting up the engine are considered to be less recognized than in manned running through the same automatic operation control. Therefore, this unmanned running gives priority to an improvement in fuel economy. The start-up threshold setting unit 99 sets the engine start-up threshold Sengst1 (at the time of unmanned running) smaller than the engine start-up threshold Sengst2 (at the time of automatic manned running). As described hitherto, the start-up threshold setting unit 99 makes the engine start-up threshold Sengst smaller at the time of automatic operation control according to unmanned running than at the time of automatic operation control according to manned running.

In cruise running through manual operation control, a deterioration in drivability resulting from a delay in the rise of the engine rotational speed Ne in the process of starting up the engine can also be considered to be more difficult to recognize than in normal running through the same manual operation control. Therefore, this manual operation control through cruise running gives priority to an improvement in fuel economy. The start-up threshold setting unit 99 sets the engine start-up threshold Sengst3 (at the time of cruising) smaller than the engine start-up threshold Sengst4 (at the time of normal running).

A relationship in magnitude of the engine start-up threshold Sengst among the respective types of operation control of the vehicle 10 is determined such that the engine start-up threshold Sengst1 (at the time of unmanned running)<the engine start-up threshold Sengst2 (at the time of automatic manned running)<the engine start-up threshold Sengst3 (at the time of cruising)<the engine start-up threshold Sengst4 (at the time of normal running). The priority of fuel economy rises as the engine start-up threshold Sengst decreases, and the priority of drivability (especially a swift rise in the engine rotational speed Ne in the process of starting up the engine) rises as the engine start-up threshold Sengst increases.

An effect similar to that of the foregoing first embodiment of the disclosure is obtained according to the present embodiment of the disclosure.

Figure 7:
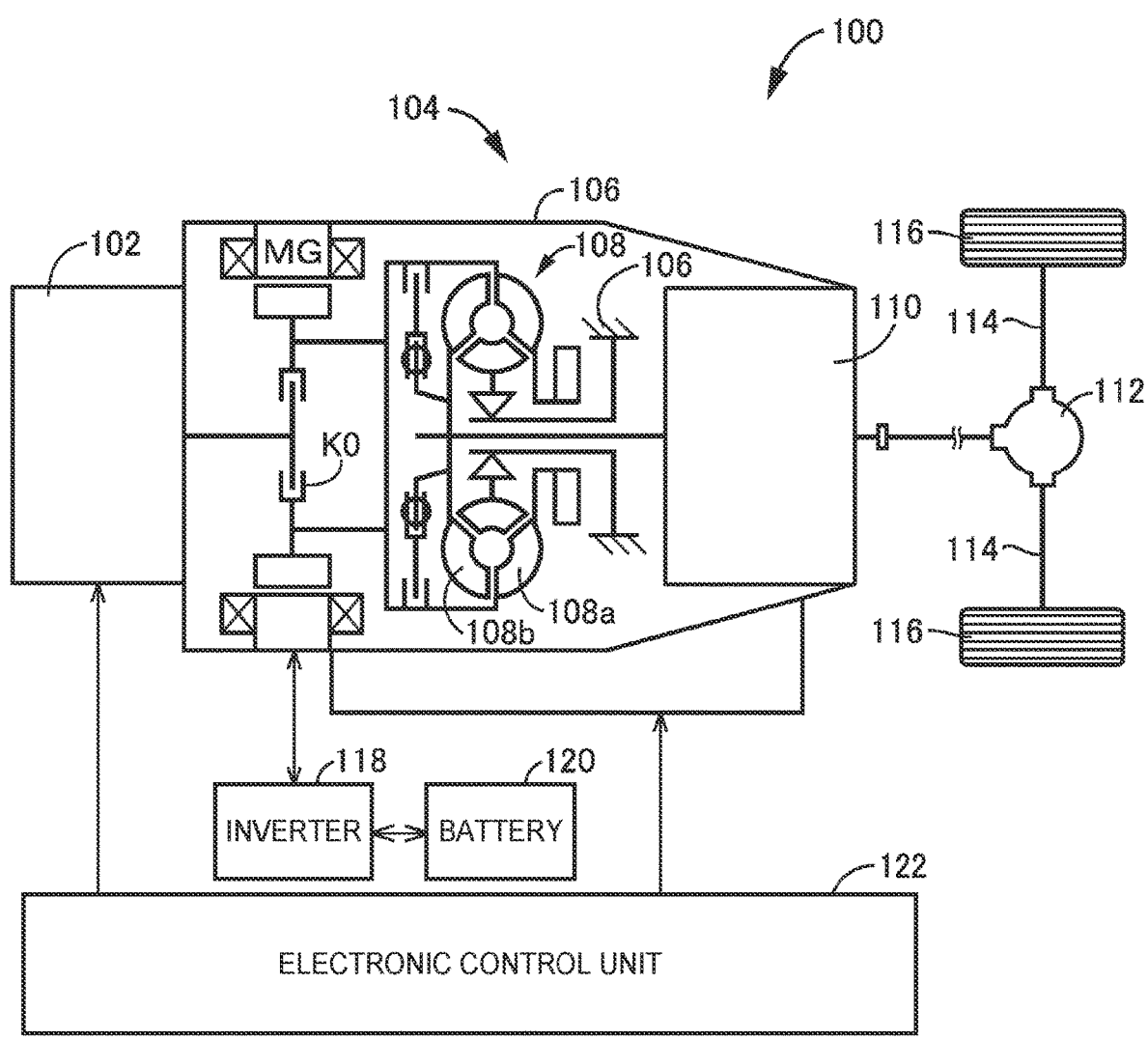
FIG. 7 is a view illustrating the general configuration of a vehicle to which the disclosure is applied and which is different from the vehicle shown in FIG. 1.

In the present embodiment of the disclosure, a vehicle 100 as shown in FIG. 7, which is different from the vehicle 10 that is equipped with the shift unit 22 that functions as the electric continuously variable transmission mentioned in the foregoing first embodiment of the disclosure, is exemplified.

In FIG. 7, the vehicle 100 is a hybrid vehicle that is equipped with an engine 102, a rotary machine MG, and a motive power transmission device 104. Each of the engine 102 and the rotary machine MG can generate a driving torque. The motive power transmission device 104 is equipped, sequentially from the engine 102 side, with a clutch K0, a torque converter 108, an automatic transmission 110 and the like, in a case 106 as a non-rotary member that is attached to a vehicle body. Besides, the motive power transmission device 104 is equipped with a differential gear device 112, an axle 114 and the like. A pump impeller 108a of the torque converter 108 is coupled to the engine 102 via the clutch K0, and is directly coupled to the rotary machine MG. A turbine impeller 108b of the torque converter 108 is directly coupled to the automatic transmission 110. In the motive power transmission device 104, the motive power of the engine 102 and/or the motive power of the rotary machine MG are/is transmitted to driving wheels 116 with which the vehicle 100 is equipped, sequentially via the clutch K0 (in the case where the motive power of the engine 102 is transmitted), the torque converter 108, the automatic transmission 110, the differential gear device 112, the axle 114 and the like. Besides, the vehicle 100 is equipped with an inverter 118, a battery 120 that gives/receives electric power to/from the rotary machine MG via the inverter 118, and an electronic control unit 122.

The electronic control unit 122 enables EV running in which only the rotary machine MG serves as a motive power source for running through the use of the electric power from the battery 120, with the clutch K0 released and with the engine 102 stopped from being operated. The electronic control unit 122 can start up the engine 102 by causing the rotary machine MG to output a cranking torque through the use of the electric power from the battery 120, while controlling the clutch K0 toward engagement. The electronic control unit 122 enables HV running in which the engine 102 serves as a motive power source for running, by operating the engine 102 with the clutch K0 engaged. In the HV running mode that enables HV running, the electronic control unit 122 can also cause the vehicle to run through the use of the electric power from the battery 120 to which the driving torque generated by the rotary machine MG is further added, or can also cause the rotary machine MG to generate an electric power by the motive power of the engine 102 and store the electric power generated by the rotary machine MG into the battery 120. As described hitherto, the battery 120 is charged by the motive power of the engine 102, and supplies electric power to the rotary machine MG. The rotary machine MG has a function as a generator that generates the electric power with which the battery 120 is charged by the motive power of the engine 102, a function as a starter that rotationally drives the engine 102 by the electric power supplied from the battery 120 in starting up the engine 102, and a function as an electric motor that generates a driving torque by the electric power supplied from the battery 120.

The electronic control unit 122 has functions similar to the respective functions of the operation control unit 92, the hybrid control unit 94 (the engine control unit 95 and the rotary machine control unit 96), the running state determination unit 98, and the start-up threshold setting unit 99 with which the electronic control unit 90 in the foregoing first embodiment of the disclosure is equipped. As is the case with the electronic control unit 90, the electronic control unit 122 can set the engine start-up threshold Sengst in consideration of the difference in operation control of the vehicle 100.

According to the present embodiment of the disclosure, an effect similar to that of the foregoing first embodiment of the disclosure is obtained.

Although the embodiments of the disclosure have been described above in detail based on the drawings, the disclosure is also applied to other aspects thereof.

For example, in each of the foregoing embodiments of the disclosure, the vehicle 10 or 100 in which automatic operation control according to unmanned running, automatic operation control according to manned running, manual operation control according to cruise running, and manual operation control according to normal running can be performed is exemplified, but the disclosure is not limited to this aspect thereof. For example, if an aspect of the disclosure in which the engine start-up threshold Sengst is made smaller at the time of automatic operation control than at the time of manual operation control is realized, any vehicle in which automatic operation control according to manned running and manual operation control according to normal running can be performed is appropriate. In this case, a relationship in magnitude of the engine start-up threshold Sengst among the respective types of operation control of the vehicle is determined such that the engine start-up threshold Sengst2 (at the time of automatic manned running) <the engine start-up threshold Sengst4 (at the time of normal running).

Besides, in each of the foregoing first and second embodiments of the disclosure, the motive power transmission device 16 of the vehicle 10 is equipped with the shift unit 22 that has the planetary gear mechanism 38 as the single pinion-type planetary gear device and that functions as the electric continuously variable transmission, but the disclosure is not limited to this aspect thereof. For example, the motive power transmission device 16 may be equipped with an automatic transmission that is provided in series with the shift unit 22, in the motive power transmission path between the shift unit 22 and the driving wheels 14. Besides, the shift unit 22 may be a shift mechanism whose differential operation is limited through the control of the clutches or brakes that are coupled to the rotary elements of the planetary gear mechanism 38. Besides, the planetary gear mechanism 38 may be a double pinion-type planetary gear device. Besides, the planetary gear mechanism 38 may be a differential gear device in which a pinion that is rotationally driven by the engine 12 and a pair of bevel gears that mesh with the pinion are coupled in an operating manner to the first rotary machine MG1 and the drive gear 24. Besides, the planetary gear mechanism 38 may be a mechanism in which an engine, a rotary machine, and driving wheels are coupled, in a manner enabling the transmission of motive power, to rotary elements of two or more planetary gear devices, in a configuration in which the planetary gear devices are coupled to one another by one or some of the rotary elements constituting the planetary gear devices.

Besides, in the foregoing third embodiment of the disclosure, the vehicle 100 may be a vehicle that is not equipped with the clutch K0 and that has the engine 102 and rotary machine MG directly coupled to the input side of the torque converter 108. In short, the disclosure is applicable to any vehicle that is equipped with an engine, a rotary machine capable of generating a driving torque, and a battery that is charged by a motive power of the engine and that supplies an electric power to the rotary machine. Incidentally, in the vehicle 100, the torque converter 108 is used as a hydraulic transmission device. However, another hydraulic transmission device such as a fluid coupling with no torque amplification effect or the like may be used. Besides, the torque converter 108 may not necessarily be provided, or may be replaced with a simple clutch.

Besides, in each of the foregoing embodiments of the disclosure, the vehicle 10 or 100 is exemplified as the vehicle to which the disclosure is applied, but the disclosure is not limited to this aspect thereof. For example, the vehicle to which the disclosure is applied may be a series hybrid vehicle that can realize EV running by driving a rotary machine for driving by an electric power of a battery with an engine stopped from being operated, in addition to causing a rotary machine for electric power generation to generate an electric power by a motive power of the engine and storing the electric power generated by the rotary machine for electric power generation into the battery.

Incidentally, the foregoing is nothing more than the embodiments of the disclosure. The disclosure can be carried out in an aspect subjected to various alterations and improvements based on the knowledge of those skilled in the art.

What is claimed is:

1. A vehicle comprising:
   an engine;
   a first rotary machine configured to output a driving torque;
   a battery configured to be charged by a motive power of the engine and supply an electric power to the first rotary machine; and
   an electronic control unit configured to:
   selectively perform: a first operation control of causing the vehicle to run based on a driver's driving operation; and a second operation control of automatically setting a target running state based on at least one of map information and road information and automatically carrying out acceleration or deceleration based on the target running state,
   while the engine is stopped, start the engine when the engine is stopped and a value representing a state of charge of the battery falls below an engine start threshold; and
   set the engine start threshold during the second operation control to be smaller than the engine start threshold during the first operation control.

2. The vehicle according to claim 1, wherein the electronic control unit is configured to, during the second operation control, start the engine when the driving torque of the first rotary machine is smaller than an upper limit of the driving torque of the first rotary machine for the first operation control.

3. The vehicle according to claim 1, wherein the electronic control unit is configured to perform the second operation control by automatically carrying out steering and the acceleration or the deceleration based on the target running state.

4. The vehicle according to claim 1, wherein the electronic control unit is configured to set the target running state by setting at least one of a target vehicle speed, a target vehicle-to-vehicle distance from a preceding vehicle, and a target spot in the map information.

5. The vehicle according to claim 1, further comprising:
   a second rotary machine that generates an electric power with which the battery is charged by the motive power of the engine and that rotationally drives the engine by an electric power supplied from the battery in starting up the engine,
   wherein the first rotary machine is configured to output the driving torque by the electric power supplied from the battery.

6. The vehicle according to claim 1, wherein the first rotary machine has a function as a generator that generates the electric power with which the battery is charged by the motive power of the engine, a function as a starter that rotationally drives the engine by the electric power supplied from the battery in starting up the engine, and a function as an electric motor that outputs the driving torque by the electric power supplied from the battery.

7. The vehicle according to claim 1, wherein
   the second operation control includes unmanned operation control and manned operation control, the unmanned operation control being operation control according to unmanned running for automatically carrying out the acceleration or the deceleration with no passenger in the vehicle, and the manned operation control being operation control according to manned running for automatically carrying out the acceleration or the deceleration with at least one passenger in the vehicle,
   the electronic control unit is configured to selectively perform the unmanned operation control and the manned operation control, and
   the electronic control unit is configured to make the engine start upstart threshold at a time of the unmanned operation control smaller than the engine start upstart threshold at a time of the manned operation control.

8. A control method for a vehicle that includes an engine, a first rotary machine configured to output a driving torque, a battery configured to be charged by a motive power of the engine and configured to supply an electric power to the first rotary machine, and an electronic control unit, the control method comprising:
   performing, by the electronic control unit, a first operation control of causing the vehicle to run based on a driver's driving operation;
   performing, by the electronic control unit, second operation control of automatically setting a target running state based on at least one of map information and road information and automatically carrying out acceleration or deceleration based on the target running state;

while the engine is stopped, starting, by the electronic control unit, the engine when a value representing a state of charge of the battery falls below an engine start threshold; and setting, by the electronic control unit, the engine start threshold during the second operation control to be smaller than the engine start threshold during the first operation control.

\* \* \* \* \*